United States Patent
Selvasekar et al.

(10) Patent No.: US 12,434,429 B2
(45) Date of Patent: Oct. 7, 2025

(54) ADDITIVELY MANUFACTURED TRIM ARTICLE

(71) Applicant: Ford Global Technologies, LLC, Dearborn, MI (US)

(72) Inventors: Siddharthan Selvasekar, Livermore, CA (US); Chris Fredriksson, LaSalle (CA); Patrick Maloney, Livonia, MI (US); Sangram Tamhankar, Canton, MI (US); Kevin VanNieulande, Fraser, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 18/180,927

(22) Filed: Mar. 9, 2023

(65) Prior Publication Data

US 2023/0211547 A1 Jul. 6, 2023
US 2024/0075681 A9 Mar. 7, 2024

Related U.S. Application Data

(63) Continuation of application No. 17/123,670, filed on Dec. 16, 2020, now Pat. No. 11,639,026.

(51) Int. Cl.
 *B29C 64/124* (2017.01)
 *B29L 31/30* (2006.01)
 (Continued)

(52) U.S. Cl.
 CPC ............ *B29C 64/124* (2017.08); *B33Y 10/00* (2014.12); *B33Y 80/00* (2014.12); *B29L 2031/30* (2013.01)

(58) Field of Classification Search
 CPC ............ B29L 2031/3023–3026; B29C 64/165
 See application file for complete search history.

(56) References Cited

U.S. PATENT DOCUMENTS

| 6,658,314 B1 | 12/2003 | Gothait |
| 10,155,884 B2 | 12/2018 | Kenney et al. |

(Continued)

FOREIGN PATENT DOCUMENTS

| DE | 102013218223 A1 | 2/2015 |
| DE | 102016225837 A1 | 6/2018 |

(Continued)

*Primary Examiner* — Alex A Rolland
(74) *Attorney, Agent, or Firm* — Vichit Chea; Price Heneveld LLP

(57) ABSTRACT

A headrest assembly includes a lattice matrix having a plurality of three-dimensional (3D) cells. Each 3D cell of includes a node and a plurality of links outwardly extending from the node. The lattice matrix includes a plurality of sections including a first section having a first overall elastic modulus, a second section positioned adjacent to the first section and having a second overall elastic modulus that is higher than the first overall elastic modulus of the first section, and a third section positioned adjacent to the second section and having a third overall elastic modulus that is higher than the second overall elastic modulus of the second section. The lattice matrix is integrally constructed using an additive manufacturing technique, wherein the 3D cells of each section are provided in various patterns and cured to varying degrees to provide the varying overall elastic moduli of each section of the lattice matrix.

6 Claims, 8 Drawing Sheets

(51) Int. Cl.
*B33Y 10/00* (2015.01)
*B33Y 80/00* (2015.01)

(56) References Cited

U.S. PATENT DOCUMENTS

| | | | |
|---|---|---|---|
| 10,216,172 | B2 | 2/2019 | Arisoy et al. |
| 10,343,565 | B2 | 7/2019 | Baek et al. |
| 10,357,955 | B2* | 7/2019 | Ziolek ................... B29C 64/171 |
| 2015/0321434 | A1 | 11/2015 | Sterman et al. |
| 2016/0075290 | A1 | 3/2016 | Catlin |
| 2016/0096318 | A1 | 4/2016 | Bickel et al. |
| 2016/0200051 | A1 | 7/2016 | Urbanic |
| 2016/0318255 | A1 | 11/2016 | Ou et al. |
| 2016/0325496 | A1* | 11/2016 | De Pena ................ B33Y 10/00 |
| 2019/0160989 | A1* | 5/2019 | Pardue .................... B60N 2/64 |

FOREIGN PATENT DOCUMENTS

| | | |
|---|---|---|
| DE | 102018119660 A1 | 2/2019 |
| WO | 2015171856 A1 | 11/2015 |
| WO | 2017093264 A1 | 6/2017 |
| WO | 2017222480 A1 | 12/2017 |
| WO | 2018097694 A1 | 5/2018 |
| WO | 2019017834 A1 | 1/2019 |

* cited by examiner

ADDITIVELY MANUFACTURED TRIM ARTICLE

CROSS-REFERENCE TO RELATED APPLICATION

This application is a continuation of U.S. patent application Ser. No. 17/123,670 filed Dec. 16, 2020, now U.S. Pat. No. 11,639,026, entitled "ADDITIVELY MANUFACTURED TRIM ARTICLE." The aforementioned related application is hereby incorporated by reference.

FIELD OF THE DISCLOSURE

The present invention generally relates to a trim article, and more specifically, to a trim article provided using an additive manufacturing technique to create a lattice matrix that is tuned on a voxel-level to provide a customized elastic modulus for the article.

BACKGROUND OF THE DISCLOSURE

The present concept provides unique structural configuration tuning in a single support unit for a trim article.

SUMMARY OF THE DISCLOSURE

According to a first aspect of the present disclosure, a method of forming a trim article, includes the following steps: (1) printing a photocurable composition with a three-dimensional (3D) printer in a layer-by-layer deposition process in a pattern of a lattice matrix having a first section, (2) irradiating the first section of the lattice matrix with an energy source to cure the first section of the lattice matrix, (3) printing the photocurable composition with the 3D printer in a layer-by-layer deposition process in the pattern of the lattice matrix to form a first group of 3D cells and a second group of 3D cells arranged in a pattern of 3D cells to define a second section of the lattice matrix that is disposed adjacent to the first section of the lattice matrix, (4) irradiating the first group of 3D cells of the second section of the lattice matrix with the energy source to cure the first group of 3D cells, such that the first group of 3D cells includes a first elastic modulus, and (5) irradiating the second group of 3D cells of the second section of the lattice matrix with the energy source to curing the second group of 3D cells, such that the second group of 3D cells includes a second elastic modulus that is higher than the first elastic modulus of the first group of 3D cells.

According to a second aspect of the present disclosure, a method for manufacturing a headrest bun includes the following steps: (1) additively manufacturing a first section of a lattice matrix comprising a plurality of three-dimensional (3D) cells, wherein each cell of the plurality of 3D cells of the first section of the lattice matrix includes a node and a plurality of links extending outwardly from the node, and further wherein the step of additively manufacturing the first section of the lattice matrix further comprises providing a build material in a layer-by-layer deposition process and curing the build material to provide the first section of the lattice matrix with a first elastic modulus, and (2) additively manufacturing a second section of the lattice matrix comprising a plurality of three-dimensional (3D) cells, wherein each cell of the plurality of 3D cells of the second section of the lattice matrix includes a node and a plurality of links extending outwardly from the node, and further wherein the step of additively manufacturing the second section of the lattice matrix further comprises depositing the build material in the layer-by-layer deposition process and curing the build material to provide the second section of the lattice matrix with a second elastic modulus that is higher than the first elastic modulus of the first section of the lattice matrix.

According to a third aspect of the present disclosure, a method of forming a trim article includes the following steps: (1) depositing a thermocurable composition in a layer-by-layer deposition process using an additive manufacturing process to form a first section of a lattice matrix, (2) heating the first section of the lattice matrix with an energy source for a first time interval to cure the first section of the lattice matrix, such that the first section of the lattice matrix includes a first elastic modulus, (3) printing the thermocurable composition in a layer-by-layer deposition process using the additive manufacturing process to form a second section of the lattice matrix that is positioned on the first section of the lattice matrix, (4) heating portions of the second section of the lattice matrix with the energy source for a second time interval that is greater than the first time interval, such that the second section of the lattice matrix includes a second elastic modulus that is higher than the first elastic modulus of the first section of the lattice matrix, (5) printing the thermocurable composition in a layer-by-layer deposition process using the additive manufacturing process to form a third section of the lattice matrix that is positioned on the second section of the lattice matrix, and (6) heating portions of the third section of the lattice matrix with the energy source for a third time interval that is greater than the second time interval, such that the third section of the lattice matrix includes a third elastic modulus that is higher than the second elastic modulus of the second section of the lattice matrix.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
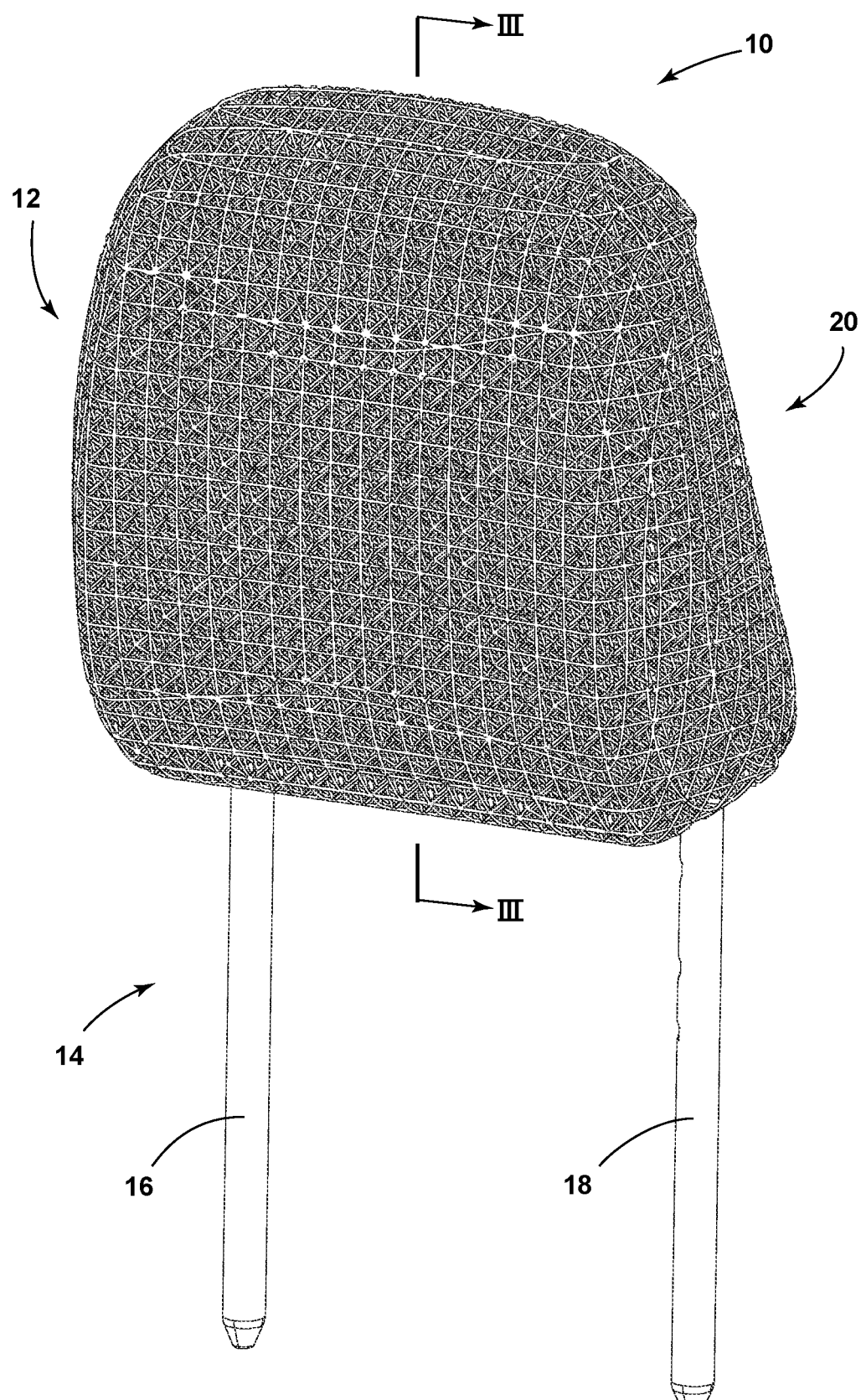
FIG. 1 is a top perspective view of a headrest assembly.

Referring now to FIG. 1, a trim article is shown in the form of a headrest assembly 10. The headrest assembly 10 includes a headrest bun 12 supported by a support armature 14. The headrest bun 12 is comprised of a lattice matrix 20 that is further comprised of multiple sections, as further described below. The lattice matrix 20 is contemplated to be a deflectable member providing a cushioning effect similar to headrest assemblies comprised of a foam padding. It is contemplated that the headrest bun 12 may include an outer casing comprised of a leather, suede, polymeric or vinyl material that is stretched over the headrest bun 12. As used herein, the term "lattice matrix" refers to a structural pattern of interconnected links and nodes that define 3D cells with voids therebetween, wherein the overall pattern of the lattice matrix resembles an expanded material configuration. Further, as used herein, the term "deflectable" refers to a component that is considered to have cushioning effect, such that the component is compressible when under pressure from an applied force. The term "deflectable" is also used herein to describe a component part that is flexibly resilient. In this way, a deflectable component part is contemplated to a be a part that can be compressed from an at-rest condition to a compressed condition under a compression force, and is further contemplated to resiliently return to the at-rest condition from the compressed condition after the compression force is removed. Thus, a deflectable lattice matrix described herein acts as a cushioning component of the headrest assembly 10.

As further shown in FIG. 1, the support armature 14 is configured to couple the headrest assembly 10 to an upper portion of a seatback. Specifically, the support armature 14 is contemplated to be a metal member which may be comprised of a steel or aluminum material, and which includes first and second support posts 16, 18. The first and second support posts 16, 18 outwardly extend from the lattice matrix 20, when the lattice matrix 20 is supported on the support armature 14. The configuration of the support armature 14 is further described below with reference to FIG. 2.

Figure 2:
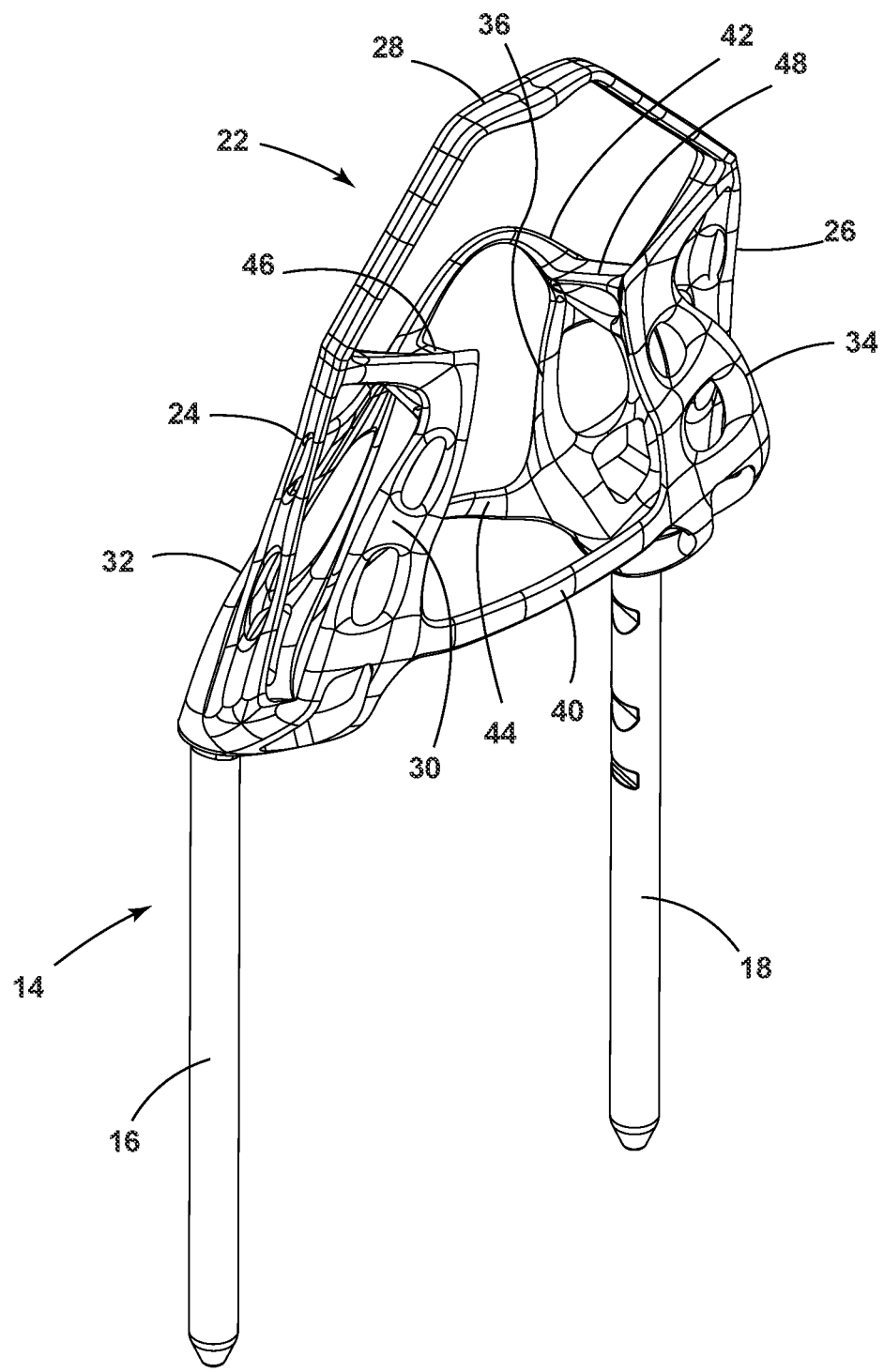
FIG. 2 is a top perspective view of a support armature of the headrest assembly of FIG. 1.

Referring now to FIG. 2, the support armature 14 includes an upper portion 22 that is received within a hollow core portion 50 (FIG. 3) of the lattice matrix 20. The upper portion 22 of the support armature 14 is supported by the first and second support posts 16, 18 and includes first and second upright portions 24, 26 that are interconnected by an upper cross-member 28. The first upright portion 24 includes front and rear support members 30, 32 which are disposed on opposed sides of the first upright portion 24. Specifically, the front support member 30 is forwardly offset relative to the first upright portion 24, and the rear support member 32 is rearwardly offset relative to the first upright portion 24. Similarly, the second upright portion 26 includes front and rear support members 34, 36 which are disposed on opposed sides of the second upright portion 26. Specifically, the front support member 34 is forwardly offset relative to the second upright portion 26, and the rear support member 36 is rearwardly offset relative to second upright portion 26. The front support members 30, 34 are interconnected by a lower cross member 40. The rear support members 32, 36 are interconnected by upper and lower cross members 42, 44. The front and rear support members 30, 32 are interconnected by a coupling portion 46, and the front and rear support members 34, 36 are also interconnected by a coupling portion 48. In this way, the upper portion 22 of the support armature 14 provides a unique frame assembly for supporting the lattice matrix 20.

Figure 3:
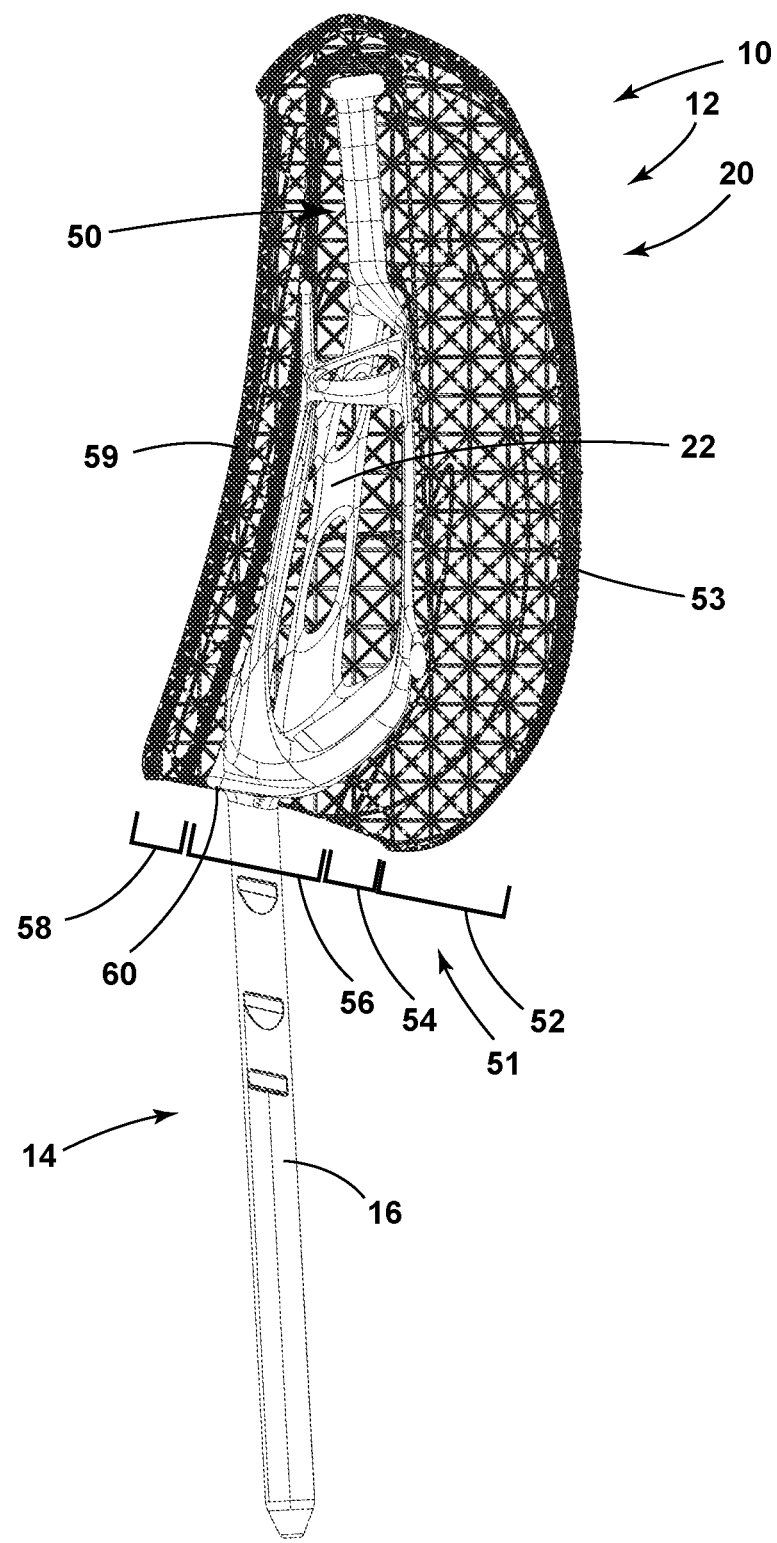
FIG. 3 is a cross-sectional view of the headrest assembly of FIG. 1 taken at line III.

Referring now to FIG. 3, the lattice matrix 20 is shown supported on the support armature 14, wherein the upper portion 22 of the support armature 14 is received within a hollow core portion 50. The lattice matrix 20 is comprised of a plurality of interconnected links, as further described below. The interconnected links define a plurality of sections 51 of the lattice matrix 20 that are contemplated to be interconnected with one another. Specifically, the lattice matrix 20 includes a first section 52 which defines a front surface 53 of the lattice matrix 20. The first section 52 includes a first elastic modulus that is contemplated to be lower than an elastic modulus of any other section of the plurality of sections 51. As used herein, the term "elastic modulus" refers to a stiffness or rigidity of a section or component part thereof. Thus, a higher elastic modulus is associated with a stiffer or more rigid section or component part thereof. Further, as used herein, the term "overall elastic modulus" refers to a stiffness or rigidity of a portion of a lattice matrix that is comprised of component parts having varying elastic moduli, as further described below.

As further shown in FIG. 3, a second section 54 of the lattice matrix 20 is positioned adjacent to and behind the first section 52. In this way, the second section 54 abuts the first section 52. The second section 54 of the lattice matrix 20 includes a second elastic modulus that is higher than the first elastic modulus of the first section 52. A third section 56 of the lattice matrix 20 is positioned adjacent to and behind the second section 54. In this way, the third section 56 abuts the second section 54, such that the second section is disposed between the first section 52 and the second section 54. The third section 56 of the lattice matrix 20 includes a third elastic modulus that is higher than the second elastic modulus of the second section 54. As shown in FIG. 3, the third section 56 of the lattice matrix 20 abuts the upper portion 22 of the support armature 14, and is contemplated to surround the same within the lattice matrix 20. The lattice matrix 20 further includes a fourth section 58 disposed on an opposite side of the hollow core portion 50 relative to the third section 56 of the lattice matrix 20. In this way, the hollow core portion 50 of the lattice matrix 20 is disposed between the third section 56 and the fourth section 58 of the lattice matrix 20. The fourth section 58 defines a rear surface 59 of the lattice matrix 20, and it is contemplated that the fourth section 58 of the lattice matrix 20 may include a fourth elastic modulus that is similar to or equal to the second elastic modulus of the second section 54. Thus, it is contemplated that the third elastic modulus of the third section 56 is higher than the fourth elastic modulus of the fourth section 58. The sections 52, 54, 56 and 58 of the plurality of sections 51 may be referred to herein as multiple layers that are part of a plurality of layers of the lattice matrix 20

As further shown in FIG. 3, the hollow core portion 50 includes a lower opening 60 in which the upper portion 22 of the support armature 14 is inserted, such that the upper portion 22 of the support armature 14 can be received within the hollow core portion 50 of the lattice matrix 20. Thus, the third section 56 of the lattice matrix 20 surrounds the hollow core portion 50 of the lattice matrix 20, with the exception of the lower opening 60. Thus, the plurality of sections 51 is positioned around the hollow core portion 50 of the lattice matrix 20.

As noted above, the first section 52 of the plurality of sections 51 of the lattice matrix 20 includes the lowest elastic modulus; the first elastic modulus. In this way, the first section 52 of the lattice matrix 20 provides for a soft deformable front outer layer of the lattice matrix configured to cushion a rear portion of a head of a vehicle seat occupant. The first section 52 of the lattice matrix 20 is configured to divide the same look and feel of a cushioned outer layer of a standard headrest assembly.

The multiple sections of the lattice matrix 20 are contemplated to be comprised of a common material, such that the plurality of sections 51 are integrated to define a unitary member in the lattice matrix 20. As noted above, the support armature 14 is contemplated to be comprised of a metal material to provide rigid support for the lattice matrix 20. The lattice matrix 20 is contemplated to be comprised of a build material constructed using an additive manufacturing technique, whereby a layer-by-layer deposition process is used to print, or otherwise deposit, the build material. The build material may include a polymeric material that is cured after deposition to form the various sections of the lattice matrix 20. As further described below, the process of curing the build material of the lattice matrix 20 involves selective curing the build material for varying intensities for time intervals to provide customized elastic moduli at various portions of the various sections of the lattice matrix 20.

As used herein, the term "integrated" refers to component parts of a unitary whole that are formed together to provide the monolithic structure of the overall article. In this way, the term "integrated" is used herein to describe component parts that are formed together as a unitary whole, as opposed to components that are separately formed and later operably coupled to one another in assembly. As used herein, the term "monolithic structure" is used to describe a structure that is integrally formed in a forming process, such as an additive manufacturing technique. Monolithic structures of the present concept provide unitary structures comprised of multiple configurations and features. It is noted that the monolithic structures of the present concept may include a single or common build material used in the additive manufacturing of the structure. Further, the lattice matrices of the present concept are not only monolithic in structure, but are specifically configured to provide variated elastic moduli on a voxel level within the lattice matrices, as further described below.

As further shown in FIG. 3, the first section 52 of the lattice matrix 20 defines an outer layer of the lattice matrix 20. This outer layer defined by the first section 52 includes a first overall elastic modulus. As further shown in FIG. 3, the third section 56 of the lattice matrix 20 defines an innermost layer of the lattice matrix 20. As noted above, the third section 56 of the lattice matrix 20 includes a third overall elastic modulus that is higher than the first overall elastic modulus of the outer layer as defined by the first section 52 of the lattice matrix 20. Further, the innermost layer defined by the third section 56 of the lattice matrix 20 surrounds the hollow core portion 50 of the lattice matrix 20. The second section 54 of the lattice matrix 20 defines an intermediate layer disposed between the outer layer and innermost layer, as respectively defined by the first section 52 and the third section 56 of the lattice matrix 20. It is contemplated that the second section 54 of the lattice matrix 20 may be comprised of multiple intermediate layers. As noted above, intermediate layer defined by the second section 54 of the lattice matrix 20 includes a second overall elastic modulus that is higher than the first overall elastic modulus of the outer layer (defined by the first section 52), and less than the third overall elastic modulus of the innermost layer (defined by the third section 56).

Figure 4:
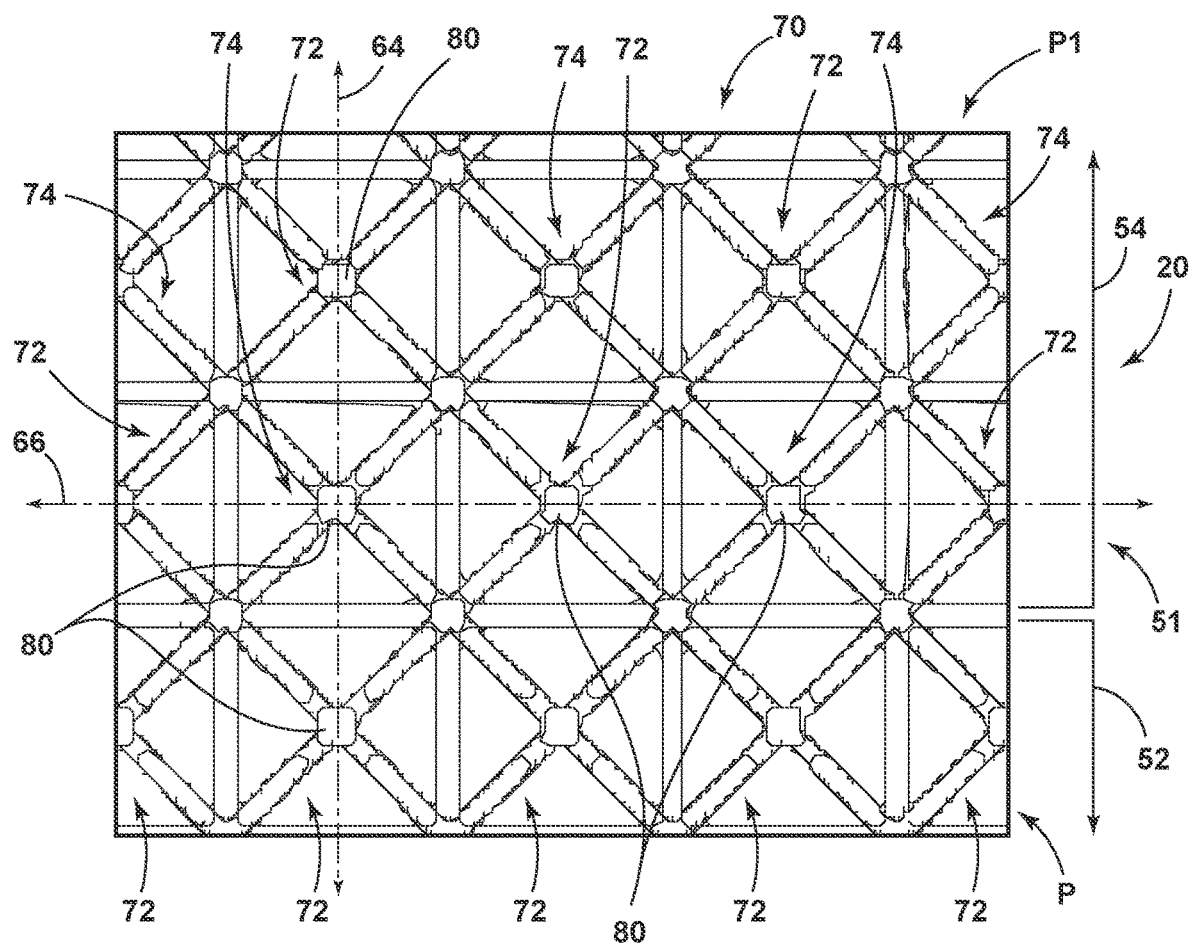
FIG. 4 is a side elevation view of a portion of a lattice matrix.

It is contemplated that the layers or sections 52, 54, 56, 58 of the plurality of sections 51 of the lattice matrix 20 are comprised of a plurality of three-dimensional (3D) cells 70, as shown in FIG. 4. The plurality of 3D cells 70 is comprised of a number of different 3D cells having unique properties, as further described below. In the view of FIG. 4, a portion of the lattice matrix 20 is shown. Specifically, portions of the first section 52 and the second section 54 of the plurality of sections 51 of the lattice matrix 20 are shown comprised of a number of 3D cells 72, 74. As shown in FIG. 4, both the first section 52 and the second section 54 of the lattice matrix 20 each include 3D cells 70. The 3D cells of the first section 52 of the lattice matrix 20 are represented by the reference numeral 72. The second section 54 of the lattice matrix 20 includes 3D cells represented by the reference numerals 72 and 74. Thus, the first section 52 of the lattice matrix 20 is contemplated to be a homogenous layer comprised of 3D cells 72 that each include an elastic modulus that is akin to a soft deflectable cushioning member as provided by the 3D cells 72.

With further reference to FIG. 4, the second section 54 of the lattice matrix 20 includes 3D cells 72, as well as 3D cells 74. In this way, the second section 54 of the lattice matrix 20 includes 3D cells from two different groups of 3D cells. Specifically, the 3D cells 72 represent a first group of 3D cells, while the 3D cells 74 represent a second group of 3D cells. The 3D cells 74 of the second group of 3D cells are contemplated to have a higher elastic modulus as compared to the 3D cells 72 of the first group of 3D cells. Thus, the second section 54 of the lattice matrix 20 is contemplated to have a higher overall elastic modulus, as compared to the overall elastic modulus of the first section 52 of the lattice matrix 20, as the second section 54 of the lattice matrix 20 includes the 3D cells 74 having the higher elastic modulus as compared to the 3D cells 72. In this way, the second section 54 of the lattice matrix 20 is a stiffer more rigid part of the lattice matrix 20, as compared to the first section 52 of the lattice matrix 20.

Figure 5:
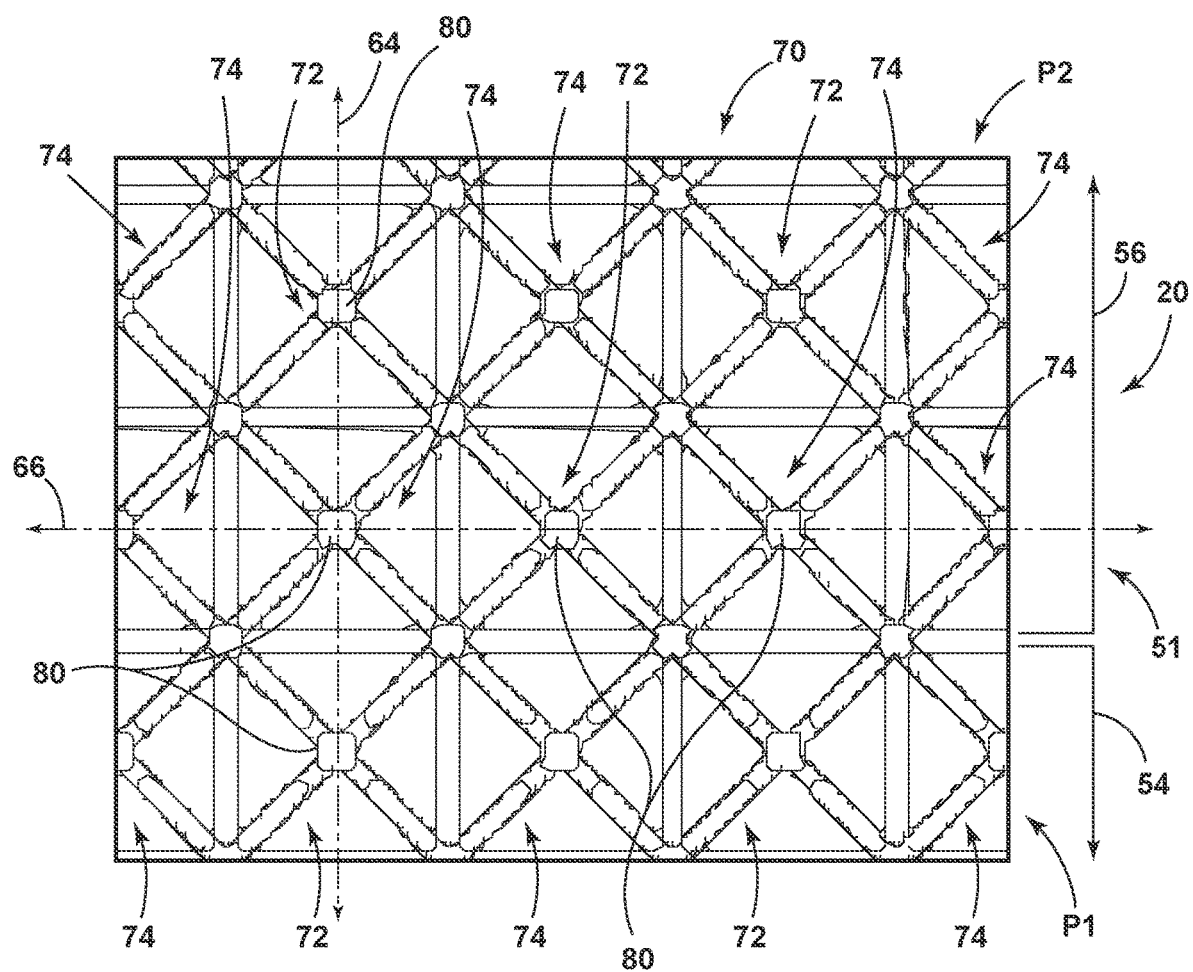
FIG. 5 is a side elevation view of another portion of the lattice matrix of FIG. 4.

Referring now to FIG. 5, the second section 54 and the third section 56 of the lattice matrix 20 both include 3D cells 72, as well as 3D cells 74. However, the third section 56 of the lattice matrix 20 includes a higher concentration or greater percentage of 3D cells 74 as compared to the number of 3D cells 74 disposed in the second section 54. Thus, the third section 56 of the lattice matrix 20 shown in the embodiment of FIG. 3 includes 3D cells from the first and second groups of 3D cells, much like the second section 54 of the lattice matrix 20. As the 3D cells 74 of the second group of 3D cells are contemplated to have a higher elastic modulus as compared to the 3D cells 72 of the first group of 3D cells, and the third section 56 of the lattice matrix 20 includes a higher concentration or higher percentage of 3D cells 74 as compared to the second section 54 of the lattice matrix 20, the third section 56 of the lattice matrix 20 is contemplated to have a higher overall elastic modulus as compared to the overall elastic modulus of the first and second sections 52, 54 of the lattice matrix 20. In this way, the third section 56 of the lattice matrix 20 is a stiffer more rigid part of the lattice matrix 20, as compared to either the first section 52 of the lattice matrix 20 or second section 54 of the lattice matrix 20. It is contemplated that the third section 56 of the lattice matrix 20 may include a pattern of 3D cells comprised of more than 50% 3D cells 74 from the second group of 3D cells. With over half of the 3D cells of the third section 56 of the lattice matrix 20 being 3D cells with a higher elastic modulus (i.e. 3D cells 74), the third section 56 of the lattice matrix 20 is contemplated to provide a rigid support structure for engagement of the upper portion 22 of the support armature 14. It is further contemplated that the entirety of the third section 56 of the lattice matrix 20 may be comprised of 3D cells 74.

In the exemplary portions of the lattice matrix 20 shown in FIGS. 4 and 5, various patterns are shown for the placement of 3D cells 72, 74 of the first and second groups of 3D cells 72, 74. As specifically shown in FIG. 4, the lattice matrix 20 includes an overall pattern P of links and nodes that defines the structure of the lattice matrix 20. As further shown in FIG. 4, the second section 54 of the lattice matrix 20 includes a pattern P1 of 3D cells 72 and 3D cells 74. Specifically, the second section 54 of the lattice matrix 20 shown in FIG. 4 illustrates an alternating pattern P1 of 3D cells 72 and 3D cells 74. As shown in FIG. 5, the third section 56 of the lattice matrix 20 includes a pattern P2 of 3D cells 72 and 3D cells 74. The pattern P2 of 3D cells of the third section 56 of the lattice matrix 20 provides for more cells from the second group of 3D cells 74 as compared to the pattern P1 of the second section 54 of the lattice matrix 20. Thus, the pattern P2 of 3D cells of the third section 56 of the lattice matrix 20 provides for a higher overall elastic modulus as compared to the first and second sections 52, 54 of the lattice matrix 20.

Figure 6:
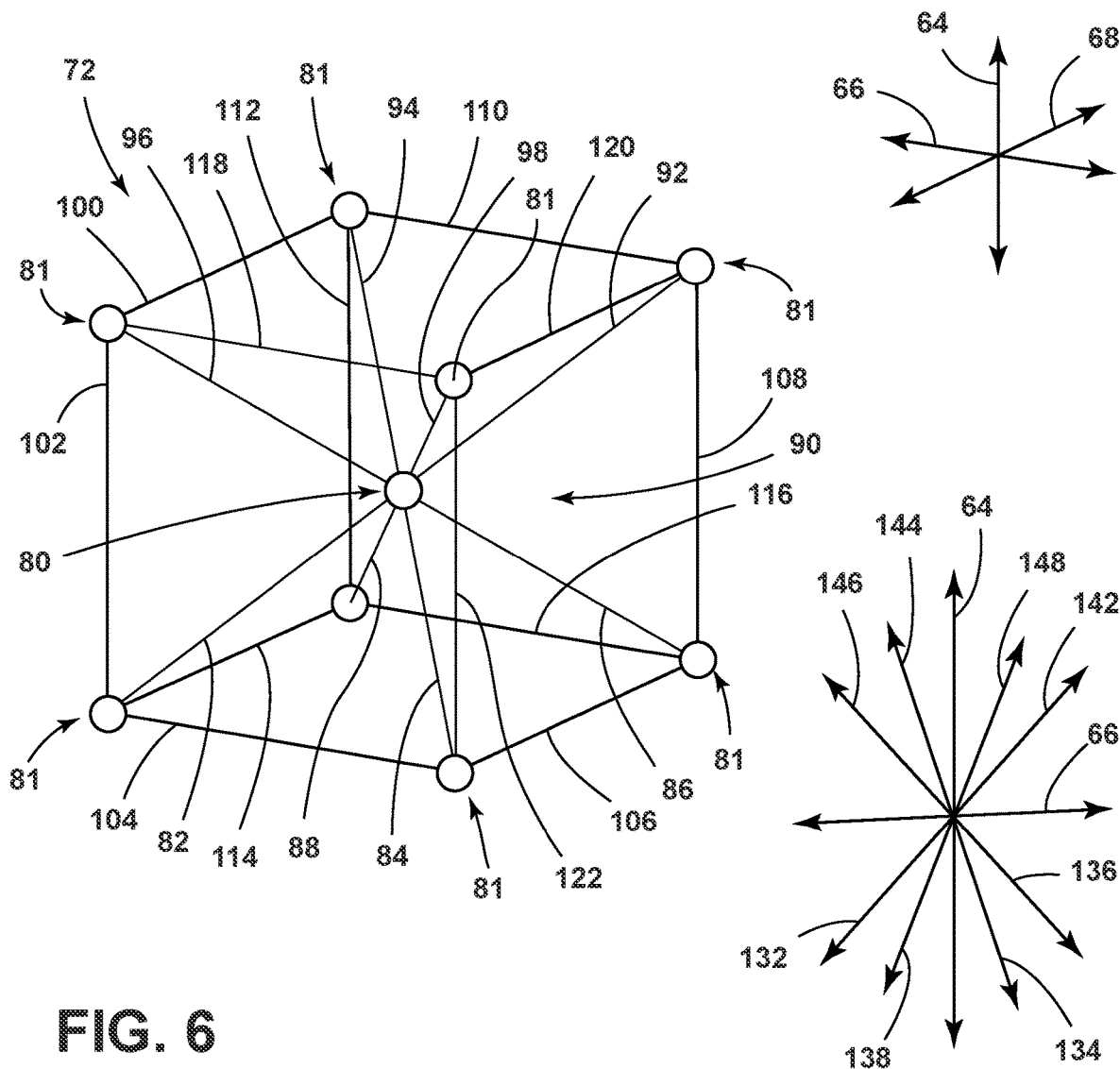
FIG. 6 is a top perspective schematic view of a 3D cell of a lattice matrix.

It is contemplated that any pattern of 3D cells may be used at any section of the plurality of sections 51 of the lattice matrix 20, so long as a stiffness gradient is provided in order of increasing stiffness from the outer layer 53 of the lattice matrix 20, to the innermost layer defined by the third section 56 of the lattice matrix 20. In the exemplary portions of the lattice matrix 20 shown in FIGS. 4 and 5, the 3D cells 72, 74 are arranged in a cubic arrangement and are aligned along the vertical direction 64 and the horizontal direction 66. The 3D cells 72, 74 are also contemplated to be aligned in a longitudinal direction 68 (FIG. 6). The directions 64, 66 and 68 are contemplated to be mutually orthogonal. As shown in FIGS. 4 and 5, the 3D cells 72, 74 include nodes 80 that are aligned with one another. The directions 64, 66 and 68 are identified to facilitate definition of the 3D cells 72, 74 described herein, and do not necessarily correspond to the actual vertical, horizontal, and longitudinal directions of the lattice matrix 20 in which the 3D cells 72, 74 are used. Further, it is contemplated that more than two groups of 3D cells may be included in the plurality of 3D cells 70. For instance, the first section 52, the second section 54, the third section 56 and the fourth section 58 of the lattice matrix 20 may each include a homogenous set of 3D cells having the varying elastic moduli as discussed above to provide the stiffness gradient defined from the outer layers 53, 59 of the lattice matrix 20, towards the hollow core portion 50. Further, the first section 52, the second section 54, the third section 56 and the fourth section 58 of the lattice matrix 20 may each include a mixture of 3D cells having varying elastic moduli, yet still provide the stiffness gradient defined from the outer layers 53, 59 of the lattice matrix 20, towards the hollow core portion 50.

Further, it is contemplated that the third section 56 of the lattice matrix 20 may include 3D cells that are printed with a build material in a layer-by-layer deposition process to form a third group of 3D cells defining the third section 56 of the lattice matrix 20. The third group of 3D cells can be cured (by irradiating or heating, or other like energy source exposure), such that the third group of 3D cells includes a third elastic modulus that is higher than the second elastic modulus of the second group of 3D cells of the second section 54 of the lattice matrix 20. Said differently, the third group of 3D cells can be exposed to an energy source for a third time interval that is greater than the second time interval noted above. In this way, the third group of 3D cells will have a higher elastic modulus as compared to the elastic moduli of the first and second groups of 3D cells 72, 74. The third section 56 of the lattice matrix 20 may include 3D cells in a pattern that is comprised of 3D cells from the first group of 3D cells 72, the second group of 3D cells 74 or the third group of 3d cells described above. It is also contemplated that the third section 56 of the lattice matrix 20 may include 3D cells that are entirely comprised of the second group of 3D cells 74 or the third group of 3d cells, or a mixture thereof.

Referring now to FIG. 6, a 3D cell is shown in schematic form to provide a sense of the overall structure a 3D cell used with the present concept may include. The 3D cell shown in FIG. 6 is represented by the reference numeral 72, however, it is contemplated that the 3D cells 74 may include a similar structure as the exemplary structure shown in FIG. 6. As specifically shown in FIG. 6, the 3D cell 72 includes a node 80 that is centrally disposed. A plurality of links 90 outwardly extending from the node 80 in various directions. Specifically, links 82, 84, 86 and 88 of the plurality of links 90 extend downwardly from the node 80 in the respective directions as indicated by arrows 132, 134, 136 and 138. Links 92, 94, 96 and 98 of the plurality of links 90 extend upwardly from the node 80 in the respective directions as indicated by arrows 142, 144, 146 and 148. As further shown in FIG. 6, links 100, 102, 104, 106, 108, 110, 112, 114, 116, 118 and 120 represent outwardly extending links from adjacent nodes 81. The interplay of the plurality of links 90 provides for the elastic modulus of the 3D cell 72.

The 3D cells 72, 74 of the present concept are contemplated to have a similar dimensions with respect to link thickness, node dimension and spacing of the voids provided between the links and nodes. However, as noted above, specific groups of 3D cells may include a different elastic modulus as compared to a different group of 3D cells. The varying elastic moduli between groups of 3D cells leads to sections of the lattice matrix 20 having varying overall elastic moduli. This is due to voxel-level tuning of the lattice matrix 20 provided during the additive manufacturing process used to create lattice matrix 20. As used herein, the term "voxel" should be taken to mean a discrete element of an actual 3D visual representation, or the corresponding element of a 3D object from which such a representation could be rendered. In this case, the voxels of the lattice matrix 20 are defined as the discrete 3D cells, such as 3D cells 72, 74, that make up the lattice matrix 20. The varying elastic moduli between groups of 3D cells is provided by specific curing techniques employed in the additive manufacturing process used to create the lattice matrix 20.

The process by which the lattice matrix 20 is manufactured will now be described. The manufacturing process, as noted above, includes an additive manufacturing technique for the creation of the lattice matrix 20. Numerous additive manufacturing techniques are known that may include a light-polymerized 3D printer, a laser sintering printer, a fused filament fabrication printer and the like. These processes may include the deposition of the build material in a layer-by-layer manner to manufacture an overall product. Other processes may use include a liquid build material that is provided in a vat and exposed to an energy source. Such additive manufacturing processes are also known to include 3D printers that use digital light projection, such as used in a stereolithography technique, or binder jetting to fuse layers of curable substrates with applications of light or heat from an energy source. As used in the present concept, exposure time intervals from the energy source are varied to provide voxel level tuning of the lattice matrix 20. Thus, adjacent voxels within the lattice matrix can include different properties based on a particular voxel's energy source exposure time interval. Increased exposure time intervals lead to resulting voxel's with higher resistance to deformation (i.e. higher elastic modulus). In identical voxels, the higher the modulus of elasticity of the material, the greater the rigidity. Thus, doubling the modulus of elasticity of a voxel doubles the rigidity of the voxel. When using light or heat from an energy source in an additive manufacturing process, it is contemplated that a photocurable or thermocurable substrate is being printed on the 3D printer. As used herein, the term "photocurable" is meant to represent a composition or build material that is cured by irradiating the build material, such as by exposure to ultraviolet (UV) light emitted from a UV light source in a digital light processing (DLP) technique. As used herein, the term "thermocurable" is meant to represent a composition or build material that is cured by heating the build material, such as by heating a build material, and potentially an adhesive, in a binder jetting process.

Figure 7:
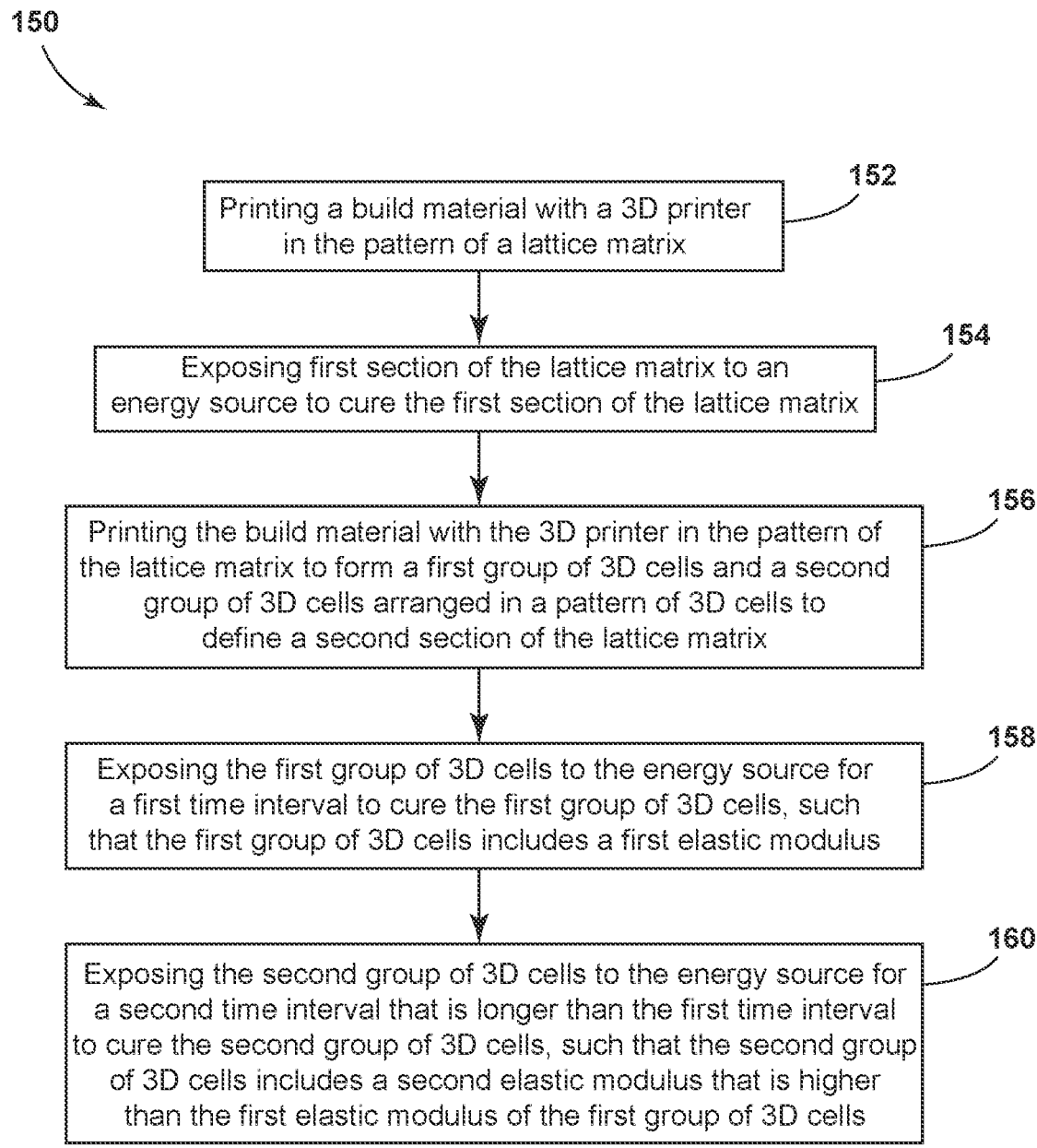
FIG. 7 is a diagram of a method of making a lattice matrix.

Referring now to FIG. 7, a method 150 of making a trim article, such as a headrest bun having a lattice matrix, is shown, and includes the following steps. In an initial step 152 of the method 150, a build material is deposited. It is contemplated that the build material is deposited, or printed, in a build box using a 3D printer. The build material is printed in the pattern of a lattice matrix, such as the pattern P of the lattice matrix 20 described above. The build material may include any material suitable for printing. The build material may be deposited in a layer-by-layer deposition process, and may be exposed to an energy source to cure the build material in a layer-by-layer manner. Specifically, in a step 154 of the method 150, a first section of a lattice matrix may be formed by curing the build material by exposing the same to an energy source. It is contemplated that the first section of the lattice matrix identified in step 154 is akin to the first section 52 of the lattice matrix 20 described above. The energy source may include a light source, such as a UV light source configured to cure a photocurable build material by irradiating the same. The energy source may also include a heat source configured to cure a thermocurable build material by heating the same. It is contemplated that the deposition step 152 and the curing step 154 of the method 150 may occur simultaneously, such that deposited build material is immediately cured following deposition. In a step 156 of the method 150 a second section of the lattice matrix may be formed by depositing or printing build material in the continued configuration of the lattice matrix 20, such that first and second groups of 3D cells are provided and arranged in a pattern of 3D cells to define the second section of the lattice matrix. It is contemplated that the second section identified in step 156 is akin to the second section 54 of the lattice matrix 20 described above. In another step 158 of the method 150, the deposited build material of the second section 54 of the lattice matrix 20 is exposed to the energy source. Specifically, it is contemplated that step 158 of the method 150 provides for exposing the first group of 3D cells to the energy source for a first time interval in order to cure the first group of 3D cells. The resulting 3D cells of the first group of 3D cells are contemplated to include a first elastic modulus, after having been exposed to the energy source for the duration of the first time interval. In another step 160 of the method 150, the deposited build material of the second section 54 of the lattice matrix 20 is exposed to the energy source. Specifically, it is contemplated that step 160 of the method 150 provides for exposing the second group of 3D cells to the energy source for a second time interval that is longer than the first time interval in order to cure the second group of 3D cells. Thus, portions of the second section 54 of the lattice matrix 20 comprised of 3D cells from the second group of 3D cells 74 are exposed to the energy source for a longer period of time (i.e. a longer time interval) as compared to portions of the second section 54 of the lattice matrix 20 comprised of 3D cells from the first group of 3D cells 72. The resulting 3D cells of the second group of 3D cells are contemplated to include a second elastic modulus that is higher than the first elastic modulus after having been exposed to the energy source for the duration of the second time interval. It is contemplated that steps 158, 160 of the method 150 may occur simultaneously after deposition of the build material for the second section of the lattice matrix to provide layers of the build material having patterns that are additively developed in a layer-by-layer manner. Thus, the pattern P1 of 3D cells shown in the second section 54 of the lattice matrix 20 may be additively manufactured in a layer-by-layer deposition in curing process to provide the 3D cells 72 of the first group of 3D cells, along with the 3D cells 74 of the second group of 3D cells, and their respective elastic moduli.

Figure 8:
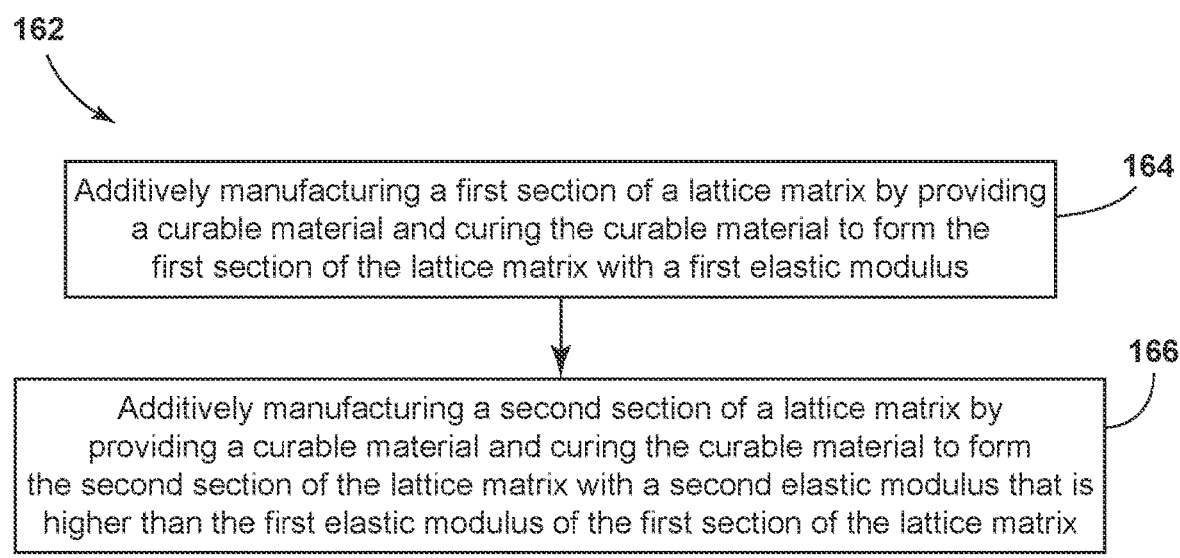
FIG. 8 is a diagram of another method of making a lattice matrix.

Referring now to FIG. 8, another method 162 is shown wherein a step 164 is provided to additively manufacture a first section of a lattice matrix by providing a curable material. The step 164 further provides for curing the curable material to form the first section of lattice matrix have any first elastic modulus. A second step 166 of the method 162 includes additively manufacturing a second section of a lattice matrix by providing a curable material. The second step 166 of the method 162 further provides for curing the curable material to form the second section of the lattice matrix having a second elastic modulus that is higher than the first elastic modulus of the first section of the lattice matrix. In this way, the method 162 provides for a method of additively manufacturing the lattice matrix 20 described above along with the plurality of sections 51, also described above.

In the methods described above, the selective exposure to an energy source provides for layers of build material that can be cured to different degrees, such that voxel level tuning of the lattice matrix is provided. Specifically, on a voxel level, the 3D cells of each section of the lattice matrix can be provided with varying elastic moduli to create a section of the lattice matrix that has an overall elastic modulus that is different than an adjacent section of the lattice matrix. For instance, it is contemplated that the lattice matrix 20 of FIG. 3 may include an exposure of the 3D cells of the first section 52 of the lattice matrix 20 to an energy source for a first time interval. It is further contemplated that the lattice matrix 20 of FIG. 3 may include an exposure of the 3D cells of the second section 54 of the lattice matrix 20 to an energy source for a second time interval that is two times (or double) as long as the first time interval. In this way, it is contemplated that the second section 54 the lattice matrix 20 will have a higher elastic modulus as compared to the elastic modulus of the first section of the lattice matrix 20. It is further contemplated that the lattice matrix 20 of FIG. 3 may include an exposure of the 3D cells of the third section 56 of the lattice matrix 20 to an energy source for a third time interval that is ten-times as long as the first time interval. In this way, it is contemplated that the third section 56 the lattice matrix 20 will have a higher elastic modulus as compared to the elastic modulus of the first section 52 of the lattice matrix 20 and the elastic modulus of the second section 54 of the lattice matrix 20. Again, as noted above, the exposure to an energy source may include exposing a build material to a heat source or a light source for the various time intervals noted above. In the method 162 described above, and illustrated in FIG. 8, it is contemplated that the plurality of sections 51 of the lattice matrix 20 may include homogenous layers of 3D cells that all have similar elastic moduli within the respective sections. In contrast, the method 150 described above, and illustrated in FIG. 7, provides for the lattice matrix 20 having multiple sections, wherein any given section of the lattice matrix 20 may have a mixture of 3D cells (i.e. multiple groups of 3D cells) arranged in a pattern, wherein the different 3D cells have different elastic moduli. That said, it is contemplated that the result of either method 150, 162 provides for a lattice matrix 20 having a plurality of sections 51, wherein each section of the plurality of sections 51 has a specific overall elastic modulus, as provided by the method of manufacture.

According to a first aspect of the present disclosure, a method of forming a trim article, includes the following steps: (1) printing a photocurable composition with a three-dimensional (3D) printer in a layer-by-layer deposition process in a pattern of a lattice matrix having a first section, (2) irradiating the first section of the lattice matrix with an energy source to cure the first section of the lattice matrix, (3) printing the photocurable composition with the 3D printer in a layer-by-layer deposition process in the pattern of the lattice matrix to form a first group of 3D cells and a second group of 3D cells arranged in a pattern of 3D cells to define a second section of the lattice matrix that is disposed adjacent to the first section of the lattice matrix, (4) irradiating the first group of 3D cells of the second section of the lattice matrix with the energy source to cure the first group of 3D cells, such that the first group of 3D cells includes a first elastic modulus, and (5) irradiating the second group of 3D cells of the second section of the lattice matrix with the energy source to curing the second group of 3D cells, such that the second group of 3D cells includes a second elastic modulus that is higher than the first elastic modulus of the first group of 3D cells.

Embodiments of the first aspect of the present disclosure can include any one or a combination of the following features:

- irradiating the first group of 3D cells for a first time interval;
- irradiating the second group of 3D cells for a second time interval that is greater than the first time interval;
- the first section of the lattice matrix includes a first overall elastic modulus, and the second section of the lattice matrix includes a second overall elastic modulus that is higher than the first overall elastic modulus of the first section of the lattice matrix;
- printing a plurality of 3D cells, wherein each 3D cell of the plurality of 3D cells includes a node and a plurality of links outwardly extending from the node;
- printing the first and second groups of 3D cells, such that each 3D cell of the first and second groups of 3D cells includes a node and a plurality of links outwardly extending from the node;
- printing the photocurable composition with the 3D printer in a layer-by-layer deposition process to form the first group of 3D cells and the second group of 3D cells arranged in a pattern of 3D cells that is different than the pattern of 3D cells of the second section of the lattice matrix to define a third section of the lattice matrix disposed adjacent to the second section of the lattice matrix;
- the pattern of 3D cells of the third section of the lattice matrix includes a greater percentage of 3D cells from the second group of 3D cells as compared to the pattern of 3D cells of the second section of the lattice matrix;
- printing the photocurable composition with the 3D printer in a layer-by-layer deposition process to form a third group of 3D cells defining a third section of the lattice matrix that is disposed adjacent to the second section of the lattice matrix;
- irradiating the third group of 3D cells of the third section of the lattice matrix with the energy source, such that the third group of 3D cells includes a third elastic modulus that is higher than the second elastic modulus of the second group of 3D cells; and
- irradiating the third group of 3D cells with the energy source for a third time interval that is greater than the second time interval.

According to a second aspect of the present disclosure, a method for manufacturing a headrest bun includes the following steps: (1) additively manufacturing a first section of a lattice matrix comprising a plurality of three-dimensional (3D) cells, wherein each cell of the plurality of 3D cells of the first section of the lattice matrix includes a node and a plurality of links extending outwardly from the node, and further wherein the step of additively manufacturing the first section of the lattice matrix further comprises providing a build material in a layer-by-layer deposition process and curing the build material to provide the first section of the lattice matrix with a first elastic modulus, and (2) additively manufacturing a second section of the lattice matrix comprising a plurality of three-dimensional (3D) cells, wherein each cell of the plurality of 3D cells of the second section of the lattice matrix includes a node and a plurality of links extending outwardly from the node, and further wherein the step of additively manufacturing the second section of the lattice matrix further comprises depositing the build material in the layer-by-layer deposition process and curing the build material to provide the second section of the lattice matrix with a second elastic modulus that is higher than the first elastic modulus of the first section of the lattice matrix.

Embodiments of the second aspect of the present disclosure can include any one or a combination of the following features:

curing the build material in a layer-by-layer manner to provide multiple layers wherein each layer of the plurality of layers includes sections cured for a first time interval and sections cured for a second time interval that is greater than the first time interval;

heating a thermocurable material in a layer-by-layer manner for a first time interval, and heating a thermocurable material in a layer-by-layer manner for a second time interval that is greater than the first time interval; and exposing a photocurable build material to an ultraviolet light source in a layer-by-layer manner for a first time interval, exposing the photocurable build material to an ultraviolet light source in a layer-by-layer manner for a second time interval that is greater than the first time interval.

According to a third aspect of the present disclosure, a method of forming a trim article includes the following steps: (1) depositing a thermocurable composition in a layer-by-layer deposition process using an additive manufacturing process to form a first section of a lattice matrix, (2) heating the first section of the lattice matrix with an energy source for a first time interval to cure the first section of the lattice matrix, such that the first section of the lattice matrix includes a first elastic modulus, (3) printing the thermocurable composition in a layer-by-layer deposition process using the additive manufacturing process to form a second section of the lattice matrix that is positioned on the first section of the lattice matrix, (4) heating portions of the second section of the lattice matrix with the energy source for a second time interval that is greater than the first time interval, such that the second section of the lattice matrix includes a second elastic modulus that is higher than the first elastic modulus of the first section of the lattice matrix, (5) printing the thermocurable composition in a layer-by-layer deposition process using the additive manufacturing process to form a third section of the lattice matrix that is positioned on the second section of the lattice matrix, and (6) heating portions of the third section of the lattice matrix with the energy source for a third time interval that is greater than the second time interval, such that the third section of the lattice matrix includes a third elastic modulus that is higher than the second elastic modulus of the second section of the lattice matrix.

Embodiments of a third aspect of the present disclosure can include any one or a combination of the following features:

heating portions of the second section of the lattice matrix on a voxel level to form 3D cells having the second elastic modulus;

heating portions of the third section of the lattice matrix on a voxel level to form 3D cells having the third elastic modulus;

the 3D cells of the second and third sections of the lattice matrix each include a node and a plurality of links outwardly extending from the node; and the second time interval is at least two times greater than the first time interval, and further wherein the third time interval is at least two times greater than the second time interval.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for manufacturing a headrest bun, comprising the steps of:
    additively manufacturing a first section of a lattice matrix comprising a plurality of three-dimensional (3D) cells, wherein each cell of the plurality of 3D cells of the first section of the lattice matrix includes a node and a plurality of links extending outwardly from the node, and further wherein the step of additively manufacturing the first section of the lattice matrix further comprises providing a build material in a layer-by-layer deposition process and heating the build material to provide the first section of the lattice matrix with a first elastic modulus, wherein the step of heating the build material to provide the first section of the lattice matrix includes heating a thermocurable material in a layer-by-layer manner for a first time interval;
    additively manufacturing a second section of the lattice matrix comprising a plurality of three-dimensional (3D) cells, wherein each cell of the plurality of 3D cells of the second section of the lattice matrix includes a node and a plurality of links extending outwardly from the node, and further wherein the step of additively manufacturing the second section of the lattice matrix further comprises depositing the build material in the layer-by-layer deposition process and heating the build material to provide the second section of the lattice matrix with a second elastic modulus that is higher than the first elastic modulus of the first section of the lattice matrix, wherein the step of heating the build material to provide the second section of the lattice matrix with a second elastic modulus further includes, heating portions of the second section of the lattice matrix on a voxel level to form 3D cells having the second elastic modulus;
    forming a hollow core portion within the lattice matrix; and
    providing a support armature within the hollow core portion to couple the lattice matrix to the support armature to form a headrest assembly.

2. The method of claim 1, wherein the step of heating the build material to provide the second section of the lattice matrix includes heating the build material in a layer-by-layer manner for a second time interval that is greater than the first time interval.

3. A method of forming a trim article, comprising the steps of:
    depositing a thermocurable composition in a layer-by-layer deposition process using an additive manufacturing process to form a first section of a lattice matrix;
    heating the first section of the lattice matrix with an energy source for a first time interval to cure the first section of the lattice matrix, such that the first section of the lattice matrix includes a first elastic modulus;
    printing the thermocurable composition in a layer-by-layer deposition process using the additive manufacturing process to form a second section of the lattice matrix that is positioned on the first section of the lattice matrix;
    heating portions of the second section of the lattice matrix with the energy source for a second time interval that is greater than the first time interval, such that the second section of the lattice matrix includes a second elastic modulus that is higher than the first elastic modulus of the first section of the lattice matrix, further wherein the step of heating portions of the second section of the lattice matrix with an energy source for a second time interval further includes, heating portions of the second section of the lattice matrix on a voxel level to form 3D cells having the second elastic modulus;

printing the thermocurable composition in a layer-by-layer deposition process using the additive manufacturing process to form a third section of the lattice matrix that is positioned on the second section of the lattice matrix;

heating portions of the third section of the lattice matrix with the energy source for a third time interval that is greater than the second time interval, such that the third section of the lattice matrix includes a third elastic modulus that is higher than the second elastic modulus of the second section of the lattice matrix;

forming a hollow core portion within the lattice matrix, such that the third section of the lattice matrix surrounds the hollow core portion and forms a lower opening to the hollow core portion; and providing a support armature within the hollow core portion via the lower opening to couple the lattice matrix to the support armature to form a headrest assembly.

4. The method of claim 3, wherein the step of heating portions of the third section of the lattice matrix with the energy source for a third time interval further includes, heating portions of the third section of the lattice matrix on a voxel level to form 3D cells having the third elastic modulus.

5. The method of claim 4, wherein the 3D cells of the second and third sections of the lattice matrix each include a node and a plurality of links outwardly extending from the node.

6. The method of claim 5, wherein the second time interval is at least two times greater than the first time interval, and further wherein the third time interval is at least two times greater than the second time interval.

* * * * *